Patented Aug. 19, 1952

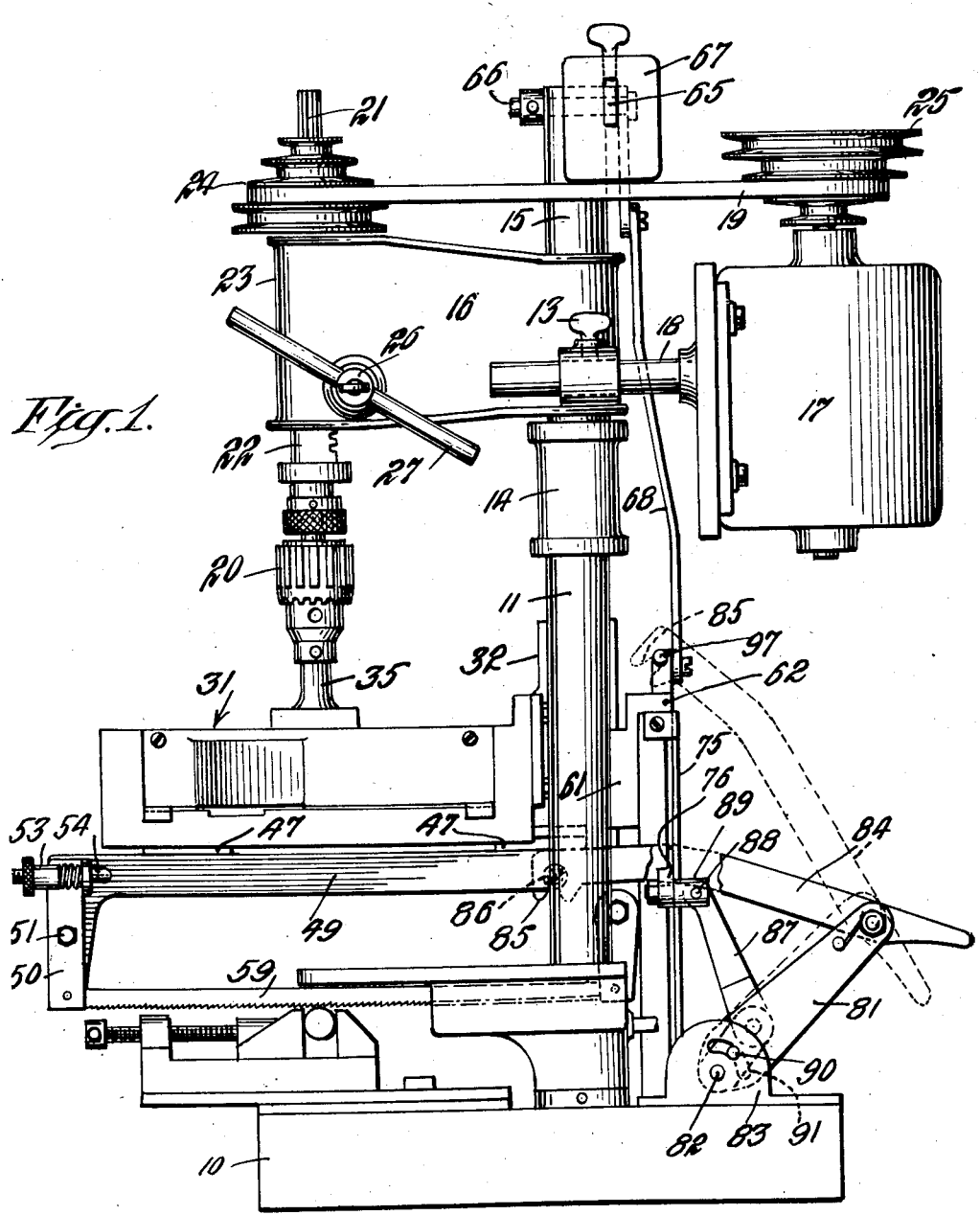

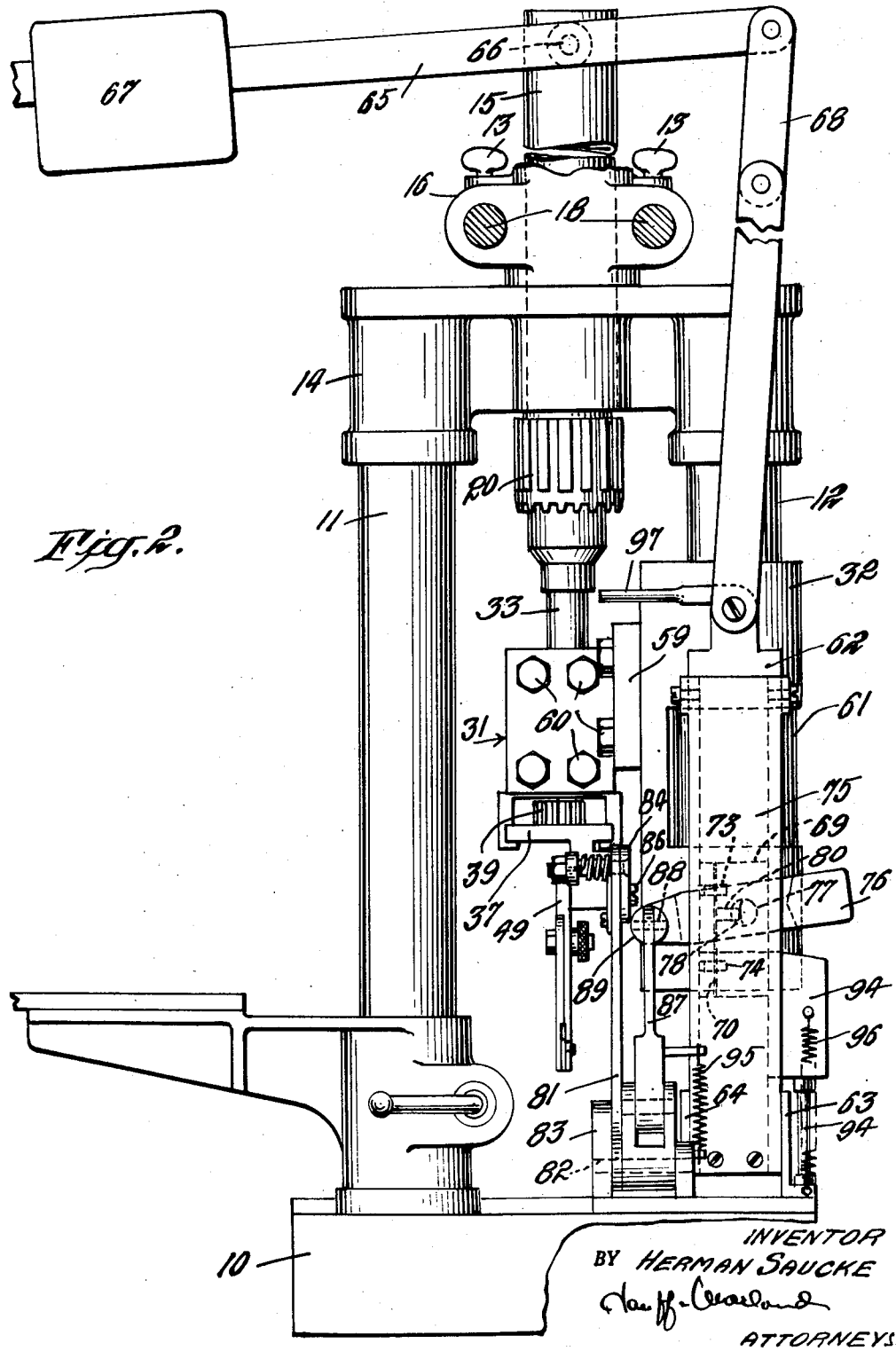

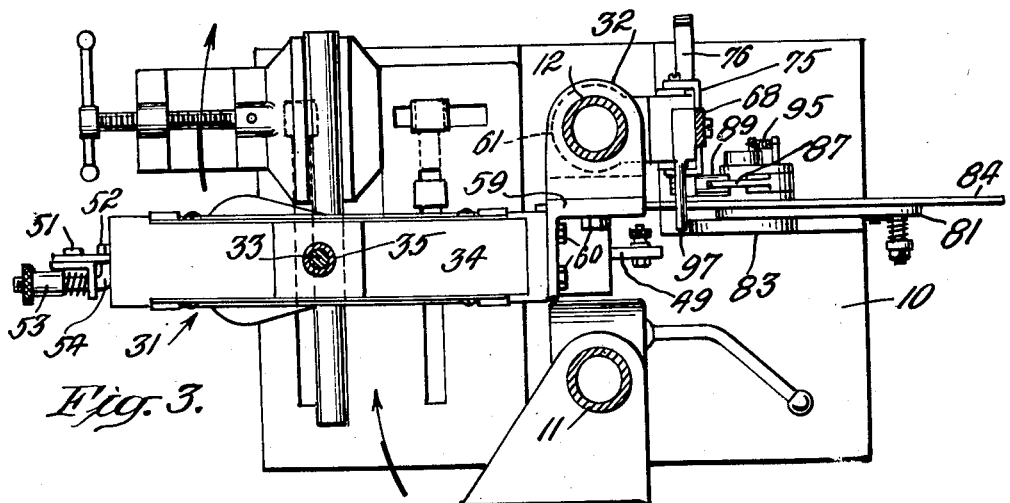
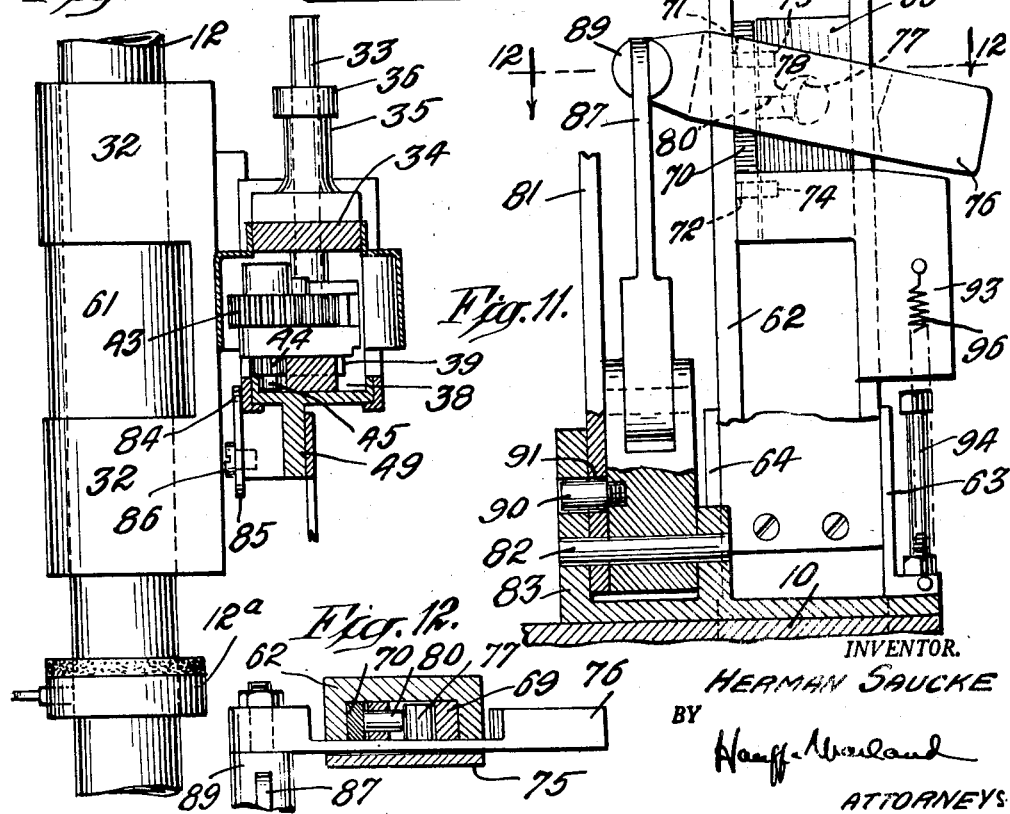

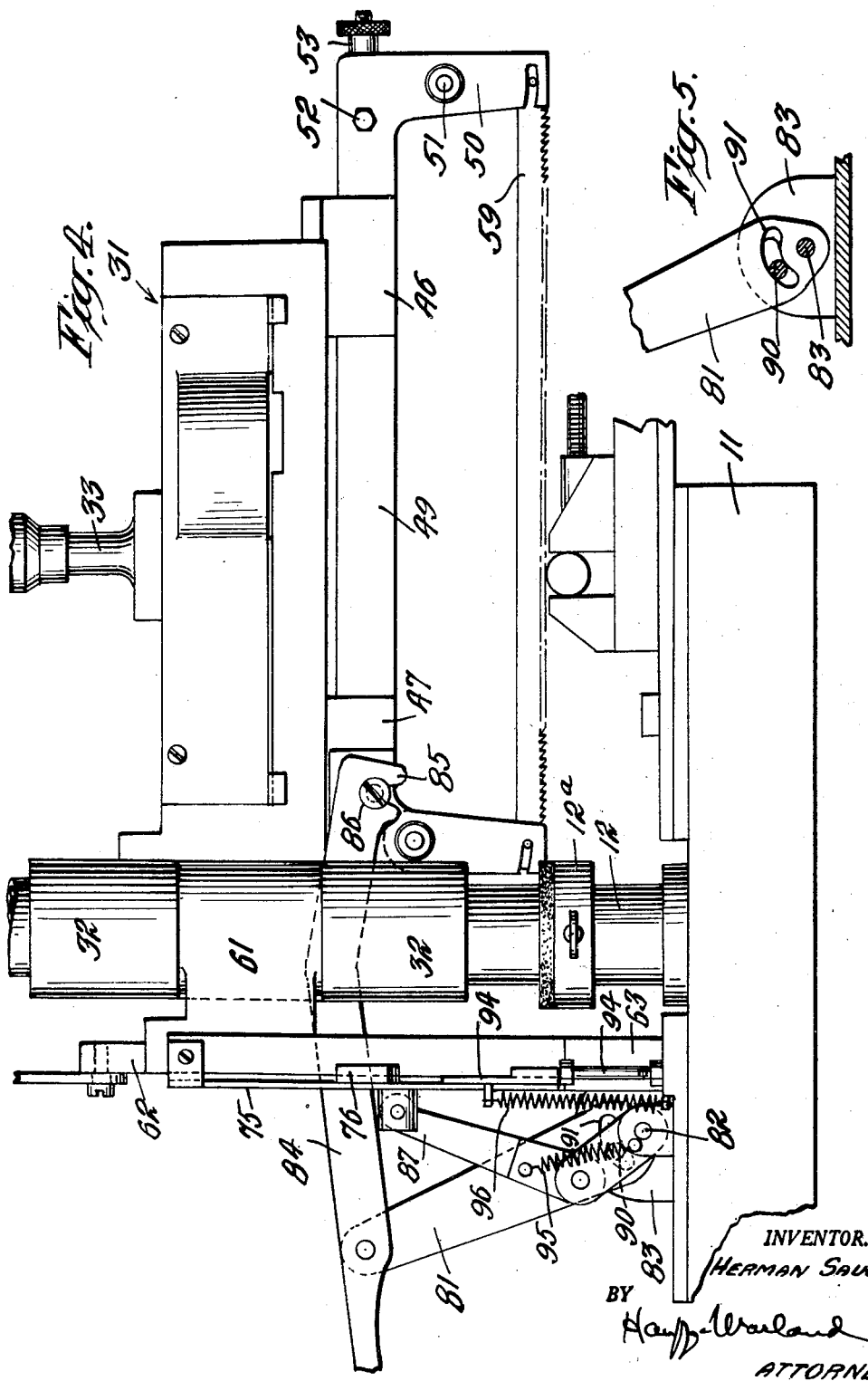

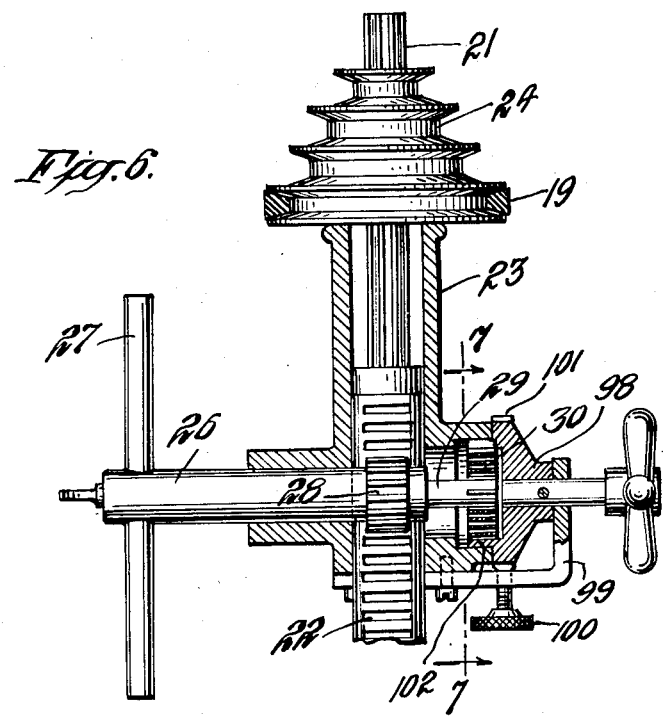
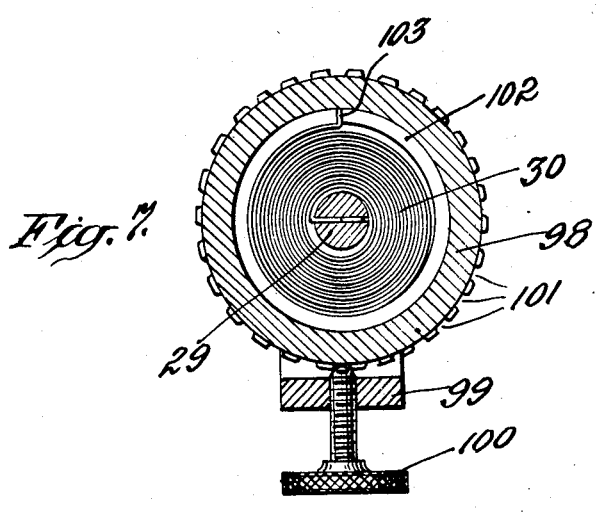

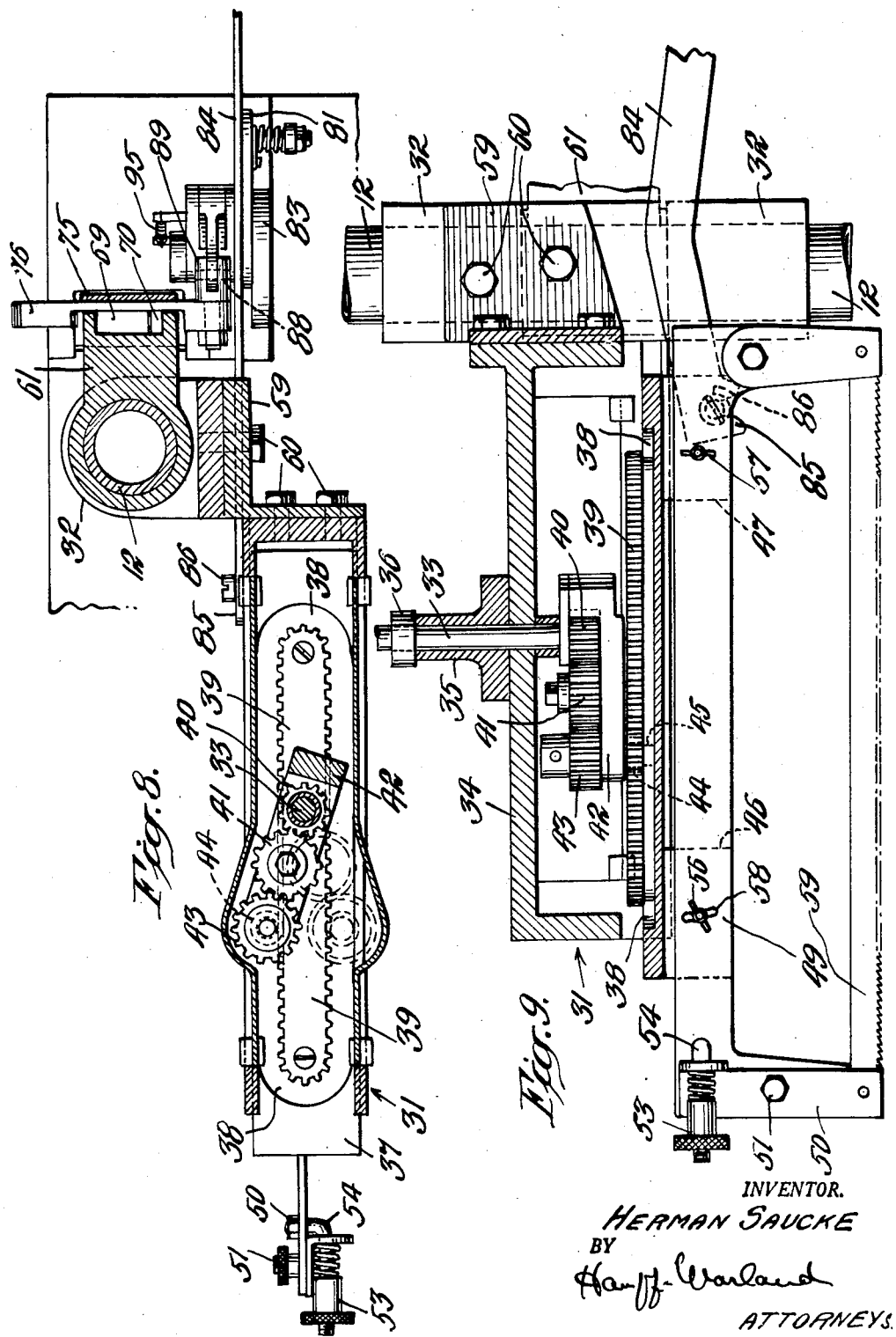

2,607,107

UNITED STATES PATENT OFFICE 2,607,107

ATTACHMENT FOR CONVERTING DRILL PRESSES FOR SAWING OPERATIONS

Herman Saucke, New York, N. Y.

Original application November 16, 1946, Serial No. 710,301, now Patent No. 2,549,934, dated April 24, 1951. Divided and this application July 8, 1950, Serial No. 172,757

3 Claims. (Cl. 29—73)

This invention relates to a device for adapting the operating elements of an ordinary drill press for new and useful applications and more particularly to equipment including a carriage slidably mounted on the post of a drill press which can be swung into engagement with the drill chuck for the performance of saw operations or the like.

This is a division of application Serial Number 710,301, filed November 16, 1946, now Patent No. 2,549,934, granted April 24, 1951.

An object of the invention is to provide a mechanism for readily converting a drill press into a saw machine.

Another object of the invention is to provide a saw attachment for a drill press which is simply and easily manipulated.

Another object of the invention is the provision of a sawing device operative from the same controls used for the drill press.

A further object of the invention is to provide means for conveniently positioning the work relative to the cutting tool.

Another object of the invention is to provide means for automatic control of the pressure on the cutting tool.

Another object of the invention is the provision of means for oscillating the cutting tool in synchronism with its reciprocation.

Although the novel features characterizing the invention will be more particularly pointed out in the claims appended hereto, the nature of the invention will be better understood by referring to the following description taken with the accompanying drawings in which a particular embodiment of the invention for sawing application has been set forth for purposes of illustration.

In the accompanying drawings:

Figure 1 is a front elevation of a drill press including my attachment.

Figure 2 is a side elevation from the right side.

Figure 3 is a sectional plan view.

Figure 4 is a view from the rear of the machine.

Figure 5 is a detail.

Figure 6 is a sectional detail of the chuck carriage and control mechanism.

Figure 7 is a section on the line 7—7 of Figure 6.

Figure 8 is a horizontal section showing the tool drive mechanism.

Figure 9 is a vertical section through the housing for the tool drive mechanism.

Figure 10 is a transverse sectional view of the tool driving mechanism.

Figure 11 shows the clutch mechanism and

Figure 12 is a detail thereof.

This invention is one that can be used in connection with a drill press in that the attachment is slidably held on the post of the drill press and so arranged that it can be swung into position or alignment with the drill chuck and driven thereby in the same manner as the device is used for a drilling operation. The advantage of this arrangement is that the drill press may be converted for the performance of a sawing operation by a few simple connections. The device then operates directly from the drilling mechanism and further means is provided whereby the drill mechanism is utilized to impart oscillating movement to the saw tool.

In the accompanying drawing and referring particularly to Figures 1 to 5, a drill press is shown including a base 10, vertical posts 11 and 12 terminating in a cross bar 14 and standard 15 for a bracket 16 which supports the chuck carriage and driving mechanism 17 in a well-known manner. A motor 17 is provided with supporting rods 18 which are slidably received in openings formed in the brackets 16 so that the tension on drive belt 19 may be regulated by the set screws 13. The chuck 20 is mounted on the lower end of drive spindle 21 which passes through the spindle rack 22 journalled in the housing 23, as shown in Figure 6. The drive spindle 21 is splined so as to slide relative to the sheave 24 which translates the motive power from the drive belt 19 and sheave 25 mounted on the drive shaft of motor 17. Transversely disposed in the housing 23 is a control shaft 26 having a handle 27 and a pinion 28 that meshes with the spindle rack 22 in a well-known manner. The other end of the control shaft 26 terminates in a hub 29 to which is secured one end of a coil spring 30, the opposite end of the coil spring 30 being secured to the interior of the housing for drilling operations so that the chuck is normally held in the elevated position and moved downwardly into the work against the action of the spring 30 by the handle 27.

In the improvements which form the subject of the present invention, a saw or tool carriage 31 is slidably and pivotally mounted on post 11 by hinge 32 as shown in Figure 4 of the drawings and the saw carriage has a spindle or shank 33 so that in operative position the spindle 33 is brought into alignment for attachment with the chuck 20 in the same manner as a drill shank.

Referring to Figure 9 the spindle 33 is journalled in the housing 34 and rests on bearing 35. The spindle 33 is provided with a flange 36 for supporting the spindle and associated mechanism within the housing. Positioned in the bottom of the housing 34 is a slide 37 provided with a raceway or channel 38 and an elongated gear 39, as shown in Figure 8. The lower end of the spindle 33 terminates in a drive pinion 40 which engages an intermediate gear 41 carried by gearlink 42. The gear 41 in turn drives a gear 43 also mounted on the gearlink 42 and mounted on a shaft which passes entirely through the gearlink and carries on its opposite end a pinion 44 which engages and reciprocates the elongated gear 39 carrying with it the slide 37, as shown in Figures 8, 9 and 10. The pinion 44 is held in engagement with gear 39 by a guide hub 45 which follows the raceway 38 as the slide 37 reciprocates. Mounted on the slide 37 are two brackets 46 and 47 for supporting a saw tool 48 which comprises a brace 49 and a plate 50 mounted pivotally on the brace at 51. Mechanism for tensioning the saw blade 52 is provided by a spring pressed set screw 53 threaded on bent screw 54 which passes through an opening in the brace 49 and held in position by nut 55. The brace 49 is held on brackets 46 and 47 by lock nuts 56 and 57. A slot 58 is in the outer end of the brace and allows angular adjustment of the saw to start the cut.

The saw carriage 31 is mounted on hinge 32 by angle iron 59 and bolts 60, as shown in Fig. 8. A sliding support 61 is carried on the post 12 between the elements of the hinge 32 so as to move vertically therewith. The support 61 carries a slidable clutch element 62, as shown in Figures 2 and 8, the lower end of which moves within the vertical guide members 63 and 64. The loading on the saw carriage 31 may be controlled and regulated by the provision of a lever 65, pivoted to standard 15 at 66, and carrying on its outer end a movable weight 67. The opposite end of lever 65 is connected to the clutch member 62 by a link 68 so that the saw carriage hinge, clutch member and weighting device move as a unit in the operation of the machine.

The clutch member 62 is channeled, as shown in Figure 8, so as to receive expansible clutch consisting of a block 69 and a plate 70 having openings 71 and 72 for guide pins 73 and 74 mounted on the block 69. The clutch slide 62 is provided with a cover plate 75 which is spaced slightly from the clutch element 62, as shown in Figure 8. A clutch lever 76, shown in Figure 11, carries a cam element 77 which is journalled in an opening 78 formed in the block 69. The block 69 also is formed with a channel 79 which receives a sliding pin 80 actuated by cam 77 to move plate 70 against the slidable clutch element 62.

In order to impart an oscillating movement to the saw carriage, the following mechanism is provided. A lever 81 is pivoted at 82 in a bed 83 mounted on the base 10 of the drill press, and at the other end carries an arm 84 having a hook 85 for attachment to the saw carriage by means of a stud 86 formed on the side of the saw carriage. Also pivotally mounted in the bed 83 to the rear of the lever 81, is a toggle link 87 which is pivoted at 88 to a stud 89 carried on the end of the clutch lever 76, as shown in Figure 1. The lower element of toggle link 87 carries a pin 90 which extends through a segmental slot 91 formed in the lever 81 and a second segmental slot 92 formed in the plate 83 of smaller dimension than the slot 91.

The downward movement of the clutch member is limited by the engagement of stop 93 secured at the lower end of the plate 69 with an adjustable bolt 94, as shown in Figure 11, and a spring 96 connects the rear end of the stop 93 with the base of the machine. The depth of cut is limited by a clamping ring 12a mounted on post 12.

The forward or cutting movement of the saw carriage moves arm 84 and lever 81 until the end of the slot in lever 81 engages the pin 90 at about half way of the forward movement and carries the toggle link 87 forward, which elevates the clutch lever 76 to expand the movable clutch element 70 into engagement with the clutch slide 62. The balance of the forward movement of the saw carriage elevates the clutch slide 62 carrying with it the hinge 32 and saw carriage 31 until the toggle 87 is moved slightly past dead center to engage the end of the slot and hold the clutch slide 62 in elevated position.

From the foregoing it will be understood that the saw carriage moves rearwardly in a slightly elevated position out of contact with the work. When the opposite end of the slot 91 in lever 81 engages pin 90, the toggle 87 is broken by spring 95, releasing the clutch elements 69 and 70 from the clutch slide 62 to thereby lower the saw carriage for the cutting stroke. When it is desired to reciprocate the saw carriage, the clutch mechanism is rendered inactive by disengaging the arm 84 and moving the hook into engagement with the lock element 97, as shown in dotted lines in Fig. 1.

In changing from drilling to sawing operation, the drill carriage 22 is converted for free vertical movement by the following mechanism. As shown in Fig. 6, a cap-like member 98 is mounted on the housing 23 by a bracket 99 which carries a set screw 100 for engagement with notches 101 formed on the cap 98. A flange 102 formed on the under-side of the cap 98 engages the coil spring 30 so that its outer end is secured to the flange, as at 103, as shown in Fig. 7. When the machine is operating as a drill press, the spring 30 may be tensioned by suitable rotation of the cap 98 and locking the spring in wound condition by the set screw 100. In converting the machine for sawing operation the set screw 100 is released so as to relieve the spring tension on drive spindle 26 and allowing free vertical movement of the carriage 22.

The usual work table 104 of the drill press is pivotally mounted on the base 11 so that it may be swung to the side when the saw carriage is connected with the drill chuck 20. The operation of the motor 17 rotates drill chuck 20 to reciprocate the slide 37 and saw tool 48 through the gear mechanism described in Figs. 8 and 9. The downward pressure on the cutting tool is regulated by varying the position of the weighting device 67 relative to the lever 65.

I claim:

1. In a reciprocating power driven tool, the combination of a housing having a longitudinal opening along the bottom thereof and a longitudinal tool carrying member reciprocably mounted in the bottom of the housing; a rectilinear gear comprising a member of substantial length having external teeth on opposite sides and ends and formed into semi-circular arcs at the opposite ends of the rectilinear gear, said rectilinear gear being fixedly mounted on the top of the tool carrying member, the tool carrying member having a vertical flange in spaced relation to the periphery of the rectilinear gear providing a track, a drive shaft journalled in the upper portion of the housing perpendicular to the rectilinear gear, a gear link pivotally mounted on the shaft and disposed above and at an acute angle to the side of the rectilinear gear, said gear link having at the extremity thereof a pinion in driving relationship with a driving pinion on the drive shaft and fixed to an intermediate rotatable shaft extending through the gear link, the plane of the rectilinear gear being transverse to and spaced axially beyond the end of the drive shaft and the gear link and driving pinion mounted thereon, a follower pinion fixed on the lower portion of the intermediate shaft in engagement with the rectilinear gear, and the intermediate shaft being extended below the follower pinion into the track between the flange and the rectilinear gear to maintain the follower pinion in continuous meshing engagement with the rectilinear gear so that the reciprocation of the tool carrying member by the driving pinion is substantially continuous, said driving pinion and the gear link being mounted in spaced relationship to the rectilinear gear so that the rectilinear gear may travel beyond the end of the drive shaft at the extremity of each stroke.

2. In a mechanical tool the combination of a housing, a tool carrying member mounted for reciprocation in the housing, a rectilinear gear mounted on the tool carrying member and comprising a member of substantial length having external teeth on opposite sides and on its ends, said ends being curved in a semi-circular arc, a drive shaft perpendicular to the rectilinear gear and a driving pinion mounted on the end of the shaft, a gear link pivotally mounted on the shaft and having a gear driven by the pinion, the plane of the rectilinear gear being transverse to and spaced axially beyond the end of the drive shaft and the gear link and driving pinion mounted thereon, a follower pinion driven by the gear and carried by the gear link at a point spaced from the pivotal mounting, said follower pinion being in driving engagement with the rectilinear gear, a guide track coextensive with and surrounding the rectilinear gear and a follower mounted on the gear link in operative relationship with the inside of the track to hold the follower pinion against the outside of the rectilinear gear during reciprocation thereof.

3. In a mechanical tool the combination of a rotary chuck, a tool carriage mechanism pivotally mounted at a point spaced from the chuck, including a spindle for connection with the chuck and a tool carrying member mounted for reciprocation in the carriage mechanism, a rectilinear gear mounted on the tool carrying member comprising a member of substantial length having external teeth on opposite sides and on its ends, said ends being curved in a semi-circular arc, a drive pinion mounted on the spindle, a gear link pivotally mounted on the spindle, the plane of the rectilinear gear being transverse to and spaced axially beyond the drive pinion and the gear link, a follower pinion carried by the gear link at a point spaced from the spindle mounting and driven through an intermediate gear between the driving pinion and the follower pinion to allow the gear link to be positioned at an acute angle relative to the side of the rectilinear gear, a guide track coextensive with and surrounding the rectilinear gear and a follower mounted on the gear link in engagement with the inside of the track and holding the follower pinion in engagement with the teeth on the rectilinear gear.

HERMAN SAUCKE.

REFERENCES CITED

The following references are of record in the file of this patent:

UNITED STATES PATENTS

| Number | Name | Date |
|---|---|---|
| 1,917,201 | Bornstein | July 4, 1933 |
| 2,228,485 | Reed | Jan. 14, 1941 |
| 2,244,607 | Blakeley | June 3, 1941 |
| 2,282,728 | Kern | May 12, 1942 |